UNITED STATES PATENT OFFICE.

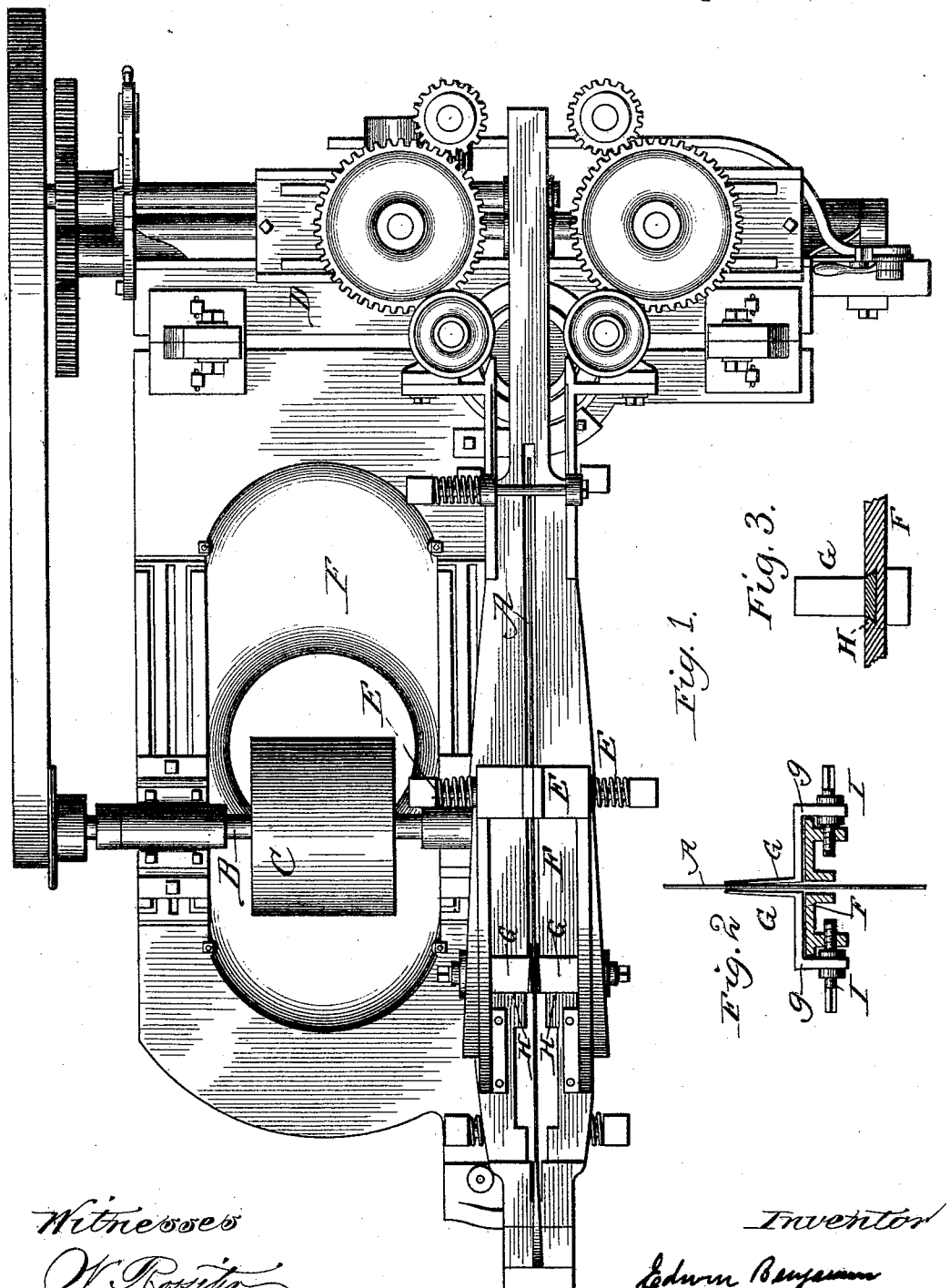

EDWIN BENJAMIN, OF SOUTH EVANSTON, ILLINOIS.

APPLIANCE FOR CIRCULAR SAWS.

SPECIFICATION forming part of Letters Patent No. 437,277, dated September 30, 1890.

Application filed June 26, 1889. Serial No. 315,632. (No model.)

*To all whom it may concern:*

Be it known that I, EDWIN BENJAMIN, of South Evanston, in the county of Cook and State of Illinois, have invented certain new and useful Improvements in Appliances for Circular Saws, of which the following is a specification.

My invention is intended to increase the efficiency of circular saws and improve the quality of their work by providing means for maintaining at all times the proper relative condition of tension between the rim and center of the saw, and thereby securing the utmost steadiness and smoothness of motion therein.

It is well known that the saw is liable to be unequally heated and expanded by varying conditions, such as the progressive dulling of the teeth, the different kinds of material worked, whether soft or hard, &c., and it thus becomes impossible to so adjust its initial tension that it will always be in proper condition, for at one time the rim may be unduly heated and at another the center. These difficulties are especially troublesome in the saws used in resawing-machines, which generally are of large diameter and relatively thin. The thinness of the lumber produced makes the presence of ridges or other marks produced by unsteady or wabbling saws especially objectionable. For these reasons I have herein shown my invention as applied to the saw of a resawing-machine.

In the accompanying drawings, Figure 1 is a plan view of a resawing-machine to which my invention is applied. Figs. 2 and 3 are detailed views, partly in section.

A is the saw of the resawing-machine, which is hung upon an arbor B, driven by pulleys C in the usual manner. The feed-works are located at D upon the frame-work on the front part of the machine. They are not described in detail, as the present specification is not specially concerned therewith; but such patentable features as are shown herein form the subject-matter of an application heretofore filed by me and serially numbered 295,671.

The rim of the saw A is guided by set-screws E E, which pass through a portion of the frame-work F, and are adjustable so as to make more or less close contact with the saw. Any other well-known means may be used for this purpose. Such devices for steadying the rim of the saw will effect their purpose only imperfectly, because if the rim of the saw becomes unduly heated it is expanded, and is thereby made "loose" and unsteady in its operation. To remedy this difficulty, I provide friction-pieces G G, which in the case of a resawing-machine also serve as deflecting-plates for separating the lumber as it is cut by the saw. The friction-pieces G G are fitted into dovetail transverse grooves H H in the frame-work F. Screws I I are journaled in the depending flanges $g$, which are formed on the outer ends of the friction-pieces G and are tapped into the frame-work, as shown in Fig. 2. By this means the friction-pieces G may be adjusted to or from the saw and may be brought into frictional contact with it near its center. In use they are so adjusted as to produce just sufficient friction with the saw to heat the center equally with the rim, the amount of friction between the plates and the saw of course depending upon the varying conditions under which the saw is being used, such as the speed, the kind of lumber, the sharpness and good condition of the teeth, &c.

In resawing and some other machines it is customary to use very wide and comparatively thin collars or flanges on the saw-arbor, so as to give as much support to the saw as possible, the deflecting-plates being used to spread the lumber sufficiently to pass the combined thickness of the saw and the collar near the center. In this case the friction or deflecting plates need not always be in frictional contact with the saw or the collar, the contact with such a collar being equivalent to contact with the saw itself, as the friction of the lumber itself on the flanges or collars which carry the saw will produce sufficient heat; but the deflecting-plates may be so adjusted as to regulate the amount of friction between the lumber and the flanges.

I claim—

1. The combination, with a circular saw, of friction-pieces near the center thereof and not extending to its edge, a device for adjusting their contact with the saw, whereby said friction-pieces are adapted to make contact with the central portion of the saw and heat the same, but do not make contact with the rim, or that portion of the saw which is exposed to excessive heating when the saw is cutting.

2. The combination, with a circular saw A, of the piece G, near the center thereof and not extending to its edge, set in the transverse groove H, and provided with a screw I, by which it may be adjusted in frictional contact with the saw, whereby said friction-piece is adapted to make contact with the central portion of the saw and heat the same, but does not make contact with the rim, or that portion of the saw which is exposed to excessive heating when the saw is cutting.

EDWIN BENJAMIN.

Witnesses:
J. I. VEEDER,
P. H. T. MASON.